US010543560B2

(12) United States Patent
Nakakura et al.

(10) Patent No.: US 10,543,560 B2
(45) Date of Patent: Jan. 28, 2020

(54) SEAM WELDING SYSTEM, SEAM WELDING METHOD, AND METHOD FOR PRODUCING A TO-BE-WELDED OBJECT WITH ROLLER ELECTRODES

(71) Applicants: KABUSHIKI KAISHA YASKAWA DENKI, Kitakyushu-shi (JP); HONDA MOTOR CO., LTD., Tokyo (JP)

(72) Inventors: Masami Nakakura, Kitakyushu (JP); Teppei Sonoda, Kitakyushu (JP)

(73) Assignees: KABUSHIKI KAISHA YASKAWA DENKI, Kitakyushu-Shi (JP); HONDA MOTOR CO., LTD., Tokyo (JP)

( * ) Notice: Subject to any disclaimer, the term of this patent is extended or adjusted under 35 U.S.C. 154(b) by 313 days.

(21) Appl. No.: 14/689,057

(22) Filed: Apr. 17, 2015

(65) Prior Publication Data

US 2015/0298244 A1 Oct. 22, 2015

(30) Foreign Application Priority Data

Apr. 18, 2014 (JP) ................................. 2014-086818

(51) Int. Cl.
*B23K 11/06* (2006.01)
*B23K 11/30* (2006.01)
*B23K 11/24* (2006.01)

(52) U.S. Cl.
CPC .............. *B23K 11/06* (2013.01); *B23K 11/24* (2013.01); *B23K 11/3036* (2013.01)

(58) Field of Classification Search
CPC ... B23K 11/067; B23K 11/093; B23K 11/255; B23K 2201/006; B23K 2201/12;
(Continued)

(56) References Cited

U.S. PATENT DOCUMENTS 2,412,069 A * 12/1946 Trinks .................... B23K 11/06
219/81
5,811,750 A * 9/1998 Caprioglio ........... B23K 11/309
219/81
(Continued)

FOREIGN PATENT DOCUMENTS

DE 10 2010 037 903 4/2012
JP 62-013276 1/1987
(Continued)

OTHER PUBLICATIONS

JP2007167896 English Machine Translation.*
(Continued)

*Primary Examiner* — Tu B Hoang
*Assistant Examiner* — Vy T Nguyen
(74) *Attorney, Agent, or Firm* — Mori & Ward, LLP (57) ABSTRACT

A seam welding system includes a pair of roller electrodes. The pair of roller electrodes hold a to-be-welded object between circumferential surfaces of the roller electrodes, rotate while holding the to-be-welded object between the circumferential surfaces, and perform seam welding on the to-be-welded object when a current flows between the roller electrodes while rotating and holding the to-be-welded object between the circumferential surfaces. To an electrode movement mechanism, the roller electrodes are mounted. The electrode movement mechanism moves the roller electrodes along a welding line of the to-be-welded object. Drive sources respectively rotate the roller electrodes and a joint of the electrode movement mechanism. A controller controls an amount by which the roller electrodes rotate based on a torque change in the drive sources so as to keep torques respectively acting on the roller electrodes within a predetermined range.

23 Claims, 7 Drawing Sheets

(58) Field of Classification Search
CPC ...... B23K 11/06; B23K 11/061; B23K 22/24;
B23K 11/25; B23K 11/253; G05B
2219/45135
USPC .......................................... 219/101, 104, 82
See application file for complete search history.

(56) References Cited

U.S. PATENT DOCUMENTS

| | | | |
|---|---|---|---|
| 7,918,380 B1* | 4/2011 | Letzkus | B21C 37/0803 |
| | | | 228/156 |
| 2010/0170879 A1 | 7/2010 | Kanaya et al. | |
| 2010/0270271 A1* | 10/2010 | Jacob | B23K 11/25 |
| | | | 219/86.25 |
| 2011/0233173 A1* | 9/2011 | Kaneko | B23K 11/002 |
| | | | 219/83 |
| 2012/0000891 A1* | 1/2012 | Nakanishi | B23K 11/115 |
| | | | 219/86.7 |
| 2014/0014638 A1* | 1/2014 | Artelsmair | B23K 9/126 |
| | | | 219/130.01 |
| 2014/0061168 A1* | 3/2014 | Nakakura | B23K 11/063 |
| | | | 219/82 |
| 2016/0045975 A1* | 2/2016 | Yamaashi | B23K 11/255 |
| | | | 219/83 |

FOREIGN PATENT DOCUMENTS

| | | | | |
|---|---|---|---|---|
| JP | 09-234566 | | 9/1997 | |
| JP | 2007167896 A | * | 7/2007 | |
| JP | 2010-158692 | | 7/2010 | |
| JP | 5609938 B2 | * | 9/2012 | ............. B23K 11/06 |
| JP | 2013-059772 | | 4/2013 | |
| KR | 10-2011-0029826 | | 3/2011 | |

OTHER PUBLICATIONS

Chinese Office Action for corresponding CN Application No. 201510059539.9, dated Oct. 8, 2016 (w/ English machine translation).
Extended European Search Report for corresponding EP Application No. 15163995.2-1702, dated Mar. 17, 2016.
Chinese Office Action for corresponding CN Application No. 201510059539.9, dated Jun. 2, 2017.
Chinese Office Action for corresponding CN Application No. 201510059539.9, dated May 28, 2018.
Chinese Office Action for corresponding CN Application No. 201510059539.9, dated Nov. 17, 2017.
Japanese Office Action for corresponding JP Application No. 2014-086818, dated Jan. 23, 2018 (w/ machine translation).
European Office Action for corresponding EP Application No. 15 163 995.2, dated Mar. 14, 2019.

* cited by examiner

SEAM WELDING SYSTEM, SEAM WELDING METHOD, AND METHOD FOR PRODUCING A TO-BE-WELDED OBJECT WITH ROLLER ELECTRODES

CROSS-REFERENCE TO RELATED APPLICATIONS

The present application claims priority under 35 U.S.C. § 119 to Japanese Patent Application No. 2014-086818, filed Apr. 18, 2014. The contents of this application are incorporated herein by reference in their entirety.

BACKGROUND

Field of the Invention

The embodiments disclosed herein relate to a seam welding system, a seam welding method, and a method for producing a to-be-welded object.

Discussion of the Background

Japanese Unexamined Patent Application Publication No. 2010-158692 discloses a seam welding system in which a robot holds a to-be-welded object and subjects the to-be-welded object to seam welding by passing the to-be-welded object through between a pair of roller electrodes.

The pair of roller electrodes each have a disk shape and each is provided with a dedicated motor to rotate each roller electrode.

While the robot is passing the to-be-welded object through between the pair of roller electrodes, the motors rotate the respective roller electrodes to hold the to-be-welded object between the roller electrodes under pressure on the circumference surfaces of the roller electrodes. A welding current flows between the roller electrodes to effect seam welding on the to-be-welded object.

Thus, the to-be-welded object and the roller electrodes move relative to each other. For this purpose, in more recent seam welding systems, the roller electrodes are mounted on the distal end of the arm of the robot, and the robot arm moves the roller electrodes along a welding line of the to-be-welded object.

SUMMARY

According to one aspect of the present disclosure, a seam welding system includes a pair of roller electrodes, an electrode movement mechanism, a plurality of drive sources, and a controller. The pair of roller electrodes are configured to hold a to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces. To the electrode movement mechanism, the pair of roller electrodes are mounted. The electrode movement mechanism is configured to move the pair of roller electrodes along a welding line of the to-be-welded object. The plurality of drive sources are respectively configured to rotate the pair of roller electrodes and a joint of the electrode movement mechanism. The controller is configured to control an amount by which the pair of roller electrodes rotate based on a torque change in the plurality of drive sources so as to keep torques respectively acting on the pair of roller electrodes within a predetermined range.

According to another aspect of the present disclosure, a seam welding method includes moving a pair of roller electrodes along a welding line of a to-be-welded object using an electrode movement mechanism. The pair of roller electrodes is disposed in the electrode movement mechanism, configured to hold the to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces. An amount by which the pair of roller electrodes rotate is controlled based on a torque change in at least one of a plurality of drive sources so as to keep torques respectively acting on the pair of roller electrodes within a predetermined range. The plurality of drive sources are respectively configured to rotate the pair of roller electrodes and a joint of the electrode movement mechanism.

According to the other aspect of the present disclosure, a method for producing a to-be-welded object includes moving a pair of roller electrodes along a welding line of a to-be-welded object using an electrode movement mechanism. The pair of roller electrodes is disposed in the electrode movement mechanism, configured to hold the to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces. An amount by which the pair of roller electrodes rotate is controlled based on a torque change in at least one of a plurality of drive sources so as to keep torques respectively acting on the pair of roller electrodes within a predetermined range. The plurality of drive sources are respectively configured to rotate the pair of roller electrodes and a joint of the electrode movement mechanism.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A seam welding system, a seam welding method, and a method for producing a to-be-welded object according to embodiments will be described in detail below by referring to the accompanying drawings. It is noted that the following embodiments are provided for exemplary purposes only and are not intended to limit the present disclosure.

The following description is concerning an exemplary seam welding system that includes a robot arm provided with a seam-welding end effector (hereinafter referred to as "welding gun") at the distal end of the robot arm.

The robot arm is an example of the electrode movement mechanism to move the roller electrodes of the welding gun. It is possible to replace the electrode movement mechanism with, for example, a uniaxial drive mechanism to move the roller electrodes. Thus, the seam welding system may not necessarily be provided with a robot arm.

Also in the following description, the to-be-welded object, which is to be subjected to seam welding, will be referred to as "workpiece".

Figure 1:
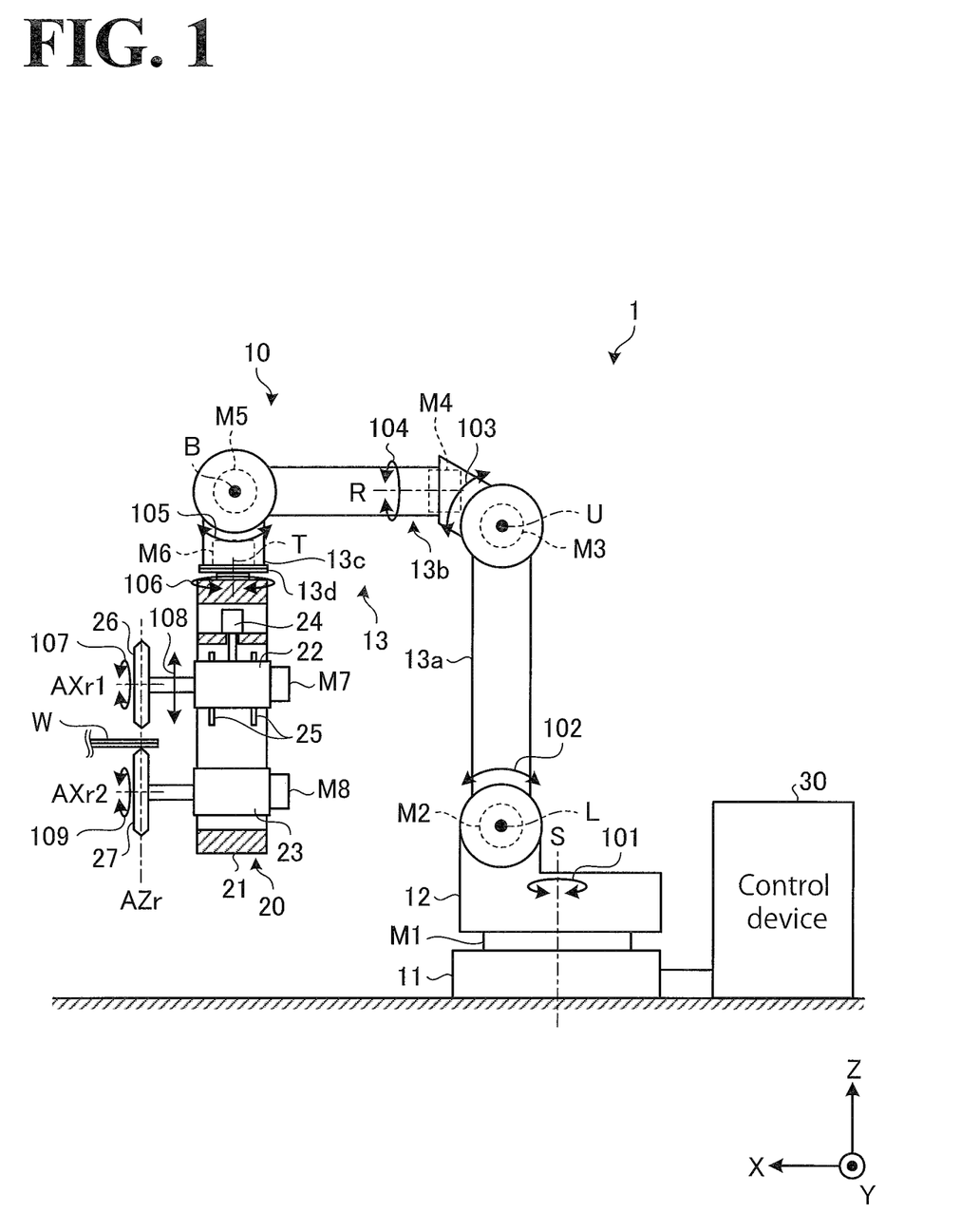
FIG. 1 is a diagram schematically illustrating a configuration of a seam welding system according to an embodiment.

FIG. 1 is a diagram schematically illustrating a configuration of a seam welding system 1 according to this embodiment. For ease of description, FIG. 1 illustrates a three-dimensional orthogonal coordinate system including a Z axis with its vertically upward direction being assumed the positive direction. This orthogonal coordinate system may also be illustrated in some other drawings referred to in the following description.

Also for ease of description, the relative positions of the parts or elements of a robot 10 and a welding gun 20 will be described under the assumption that the robot 10 and the welding gun 20 have rotated to respective positions illustrated in FIG. 1 and are oriented as illustrated in FIG. 1.

As illustrated in FIG. 1, the seam welding system 1 includes the robot 10, the welding gun 20, and a control device 30.

The robot 10 also includes a base 11, a rotational base 12, and a robot arm 13. The robot arm 13 includes a lower arm 13a, an upper arm 13b, a wrist 13c, and a flange 13d.

In the following description, the side of the installation surface on which the base 11 of the robot 10 is based will be referred to as "base end side", and a portion of each part or element on the base end side will be referred to as "base end". The flange 13d side of the robot 10 will be referred to as "distal end side", and a portion of each part or element of the robot 10 on the distal end side will be referred to as "distal end".

The base 11 is a support base secured to a floor surface such as an installation surface. The rotational base 12 is rotatable on the base 11. The lower arm 13a is rotatable relative to the rotational base 12.

The upper arm 13b is rotatable relative to the lower arm 13a. The wrist 13c is swingable on the distal end of the upper arm 13b. The flange 13d is rotatable relative to the wrist 13c.

The welding gun 20 is mounted to the flange 13d. Specifically, the robot arm 13 supports the welding gun 20.

A configuration of the robot 10 will be described in more detail below. As illustrated in FIG. 1, the robot 10 is what is called a vertical multi-articular robot. The rotational base 12 is coupled to the base 11 in a rotatable manner about the rotation axis S relative to the base 11 (see the arrows 101 illustrated in FIG. 1).

The lower arm 13a is coupled to the rotational base 12 in such a manner that the base end of the lower arm 13a is rotatable about an axis L relative to the rotational base 12 (see the arrows 102 illustrated in FIG. 1). The axis L is approximately perpendicular to the rotation axis S (including a position associated with torsion).

The upper arm 13b is coupled to the distal end of the lower arm 13a in such a manner that the base end of the upper arm 13b is rotatable about an axis U, which is approximately parallel to the axis L, relative to the distal end of the lower arm 13a (see the arrows 103 illustrated in FIG. 1). The upper arm 13b is rotatable about an axis R, which is approximately perpendicular to the axis U (including a position associated with torsion) (see the arrows 104 illustrated in FIG. 1).

The wrist 13c is coupled to the distal end of the upper arm 13b in such a manner that the base end of the wrist 13c is swingable about an axis B, which is approximately perpendicular to the axis R, relative to the distal end of the upper arm 13b (see the arrows 105 illustrated in FIG. 1). The flange 13d is coupled to the wrist 13c in a rotatable manner about an axis T, which is approximately perpendicular to the axis B, relative to the wrist 13c (see the arrows 106 illustrated in FIG. 1).

The robot arm 13 includes joints, which are movable portions. The joints are respectively provided with servo motors M1 to M6. The servo motors M1 to M6 control respective rotational positions of the robot 10 and thus enable the robot 10 to change into various postures.

The welding gun 20 is mounted to the flange 13d, as described above. Next, a specific configuration of the welding gun 20 will be described. For ease of description, the welding gun 20 is illustrated in FIG. 1 in an approximately cross-sectional view with a frame 21 cut on an X-Y plane.

As illustrated in FIG. 1, the welding gun 20 includes the frame 21, a movable block 22, a fixed block 23, a cylinder 24, a track 25, and a pair of roller electrodes 26 and 27.

The frame 21 supports the movable block 22 and the fixed block 23. The movable block 22 is coupled to the cylinder 24, which drives the movable block 22 to slide along the track 25. The fixed block 23 is fixed to the frame 21.

The pair of roller electrodes 26 and 27 each have an approximately disk shape in a view in the X axis direction in FIG. 1. The roller electrode 26 is coupled to the movable block 22 in a rotatable manner about an axis AXr1 relative to the movable block 22 (see the arrows 107 illustrated in FIG. 1).

The roller electrode 26 is rotated by the servo motor M7, which is disposed in the movable block 22. In conjunction with the slide movement of the movable block 22, the roller electrode 26 is slidable in the directions indicated by the arrows 108 illustrated in FIG. 1.

The other roller electrode 27 is coupled to the fixed block 23 in a rotatable manner about an axis AXr2 relative to the fixed block 23 (see the arrows 109 illustrated in FIG. 1). The roller electrode 27 is rotated by the servo motor M8, which is disposed in the fixed block 23.

This configuration of the welding gun 20 ensures that the position and the posture of the welding gun 20 change as the robot 10, which is an electrode movement mechanism, moves. Specifically, the pair of roller electrodes 26 and 27 rotate while holding a workpiece W between the circumferential surfaces of the pair of roller electrodes 26 and 27, and perform seam welding on the workpiece W when a current flows between the pair of roller electrodes 26 and 27 while rotating and holding the workpiece W between the circumferential surfaces.

By the current flowing between the pair of roller electrodes 26 and 27, it is intended to mean that a welding current flows from the roller electrode 27, flows through a feed cable (not illustrated) coupled to the roller electrode 27, and reaches a ground cable (not illustrated) coupled to the roller electrode 26. Inversely, the roller electrode 26 may be the feeding side and the roller electrode 27 may be the ground side.

Next, the control device 30 will be described. The control device 30 is coupled in an information transmittable manner to the above-described various devices such as the robot 10 and the welding gun 20. It is noted that any form of connection, wired or wireless, may be employed.

Here, the control device 30 is a controller to control the various devices coupled to the control device 30 to operate, and includes various control-related devices, a processing unit, and a storage device.

The control device 30 performs operation control to, for example, change the positions and the postures of the robot 10 and the welding gun 20 based on a "job", which is a particular program to move the robot 10 and the welding gun 20. The "job" are registered as teaching information 32a (described later) in advance in a storage 32 (described later) of the control device 30 using an input device (for example, programming pendant), not illustrated.

Based on the "job", the control device 30 generates movement signals to operate the robot 10 and the welding gun 20, and outputs the movement signals to the robot 10 and the welding gun 20. The movement signals are generated as, for example, pulse signals for the servo motors M1 to M6 and servo motors M7 and M8, which are respectively disposed in the robot 10 and the welding gun 20. A configuration of the control device 30 will be described in detail later by referring to FIGS. 3A and 3B.

Next, by referring to FIGS. 2A to 2H, a general description will be made with regard to a seam welding method applicable to the seam welding system 1 according to this embodiment. FIGS. 2A to 2H are diagrams and graphs schematically illustrating first to eighth aspects of the seam welding method according to this embodiment.

Figure 2A:
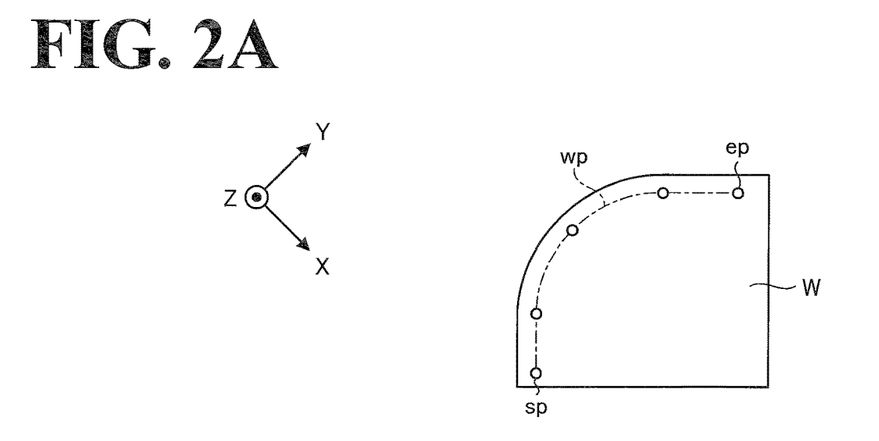
FIG. 2A is a diagram schematically illustrating a first aspect of a seam welding method according to the embodiment.

FIG. 2A illustrates a schematic plan view of the workpiece W. The symbols "sp" and "ep" respectively indicate "start point" and "end point". The following description will be under the assumption that an arcuate line connecting between the start point sp and the end point ep is a to-be-welded line wp.

First, movements of the robot 10 and the welding gun 20 are taught in order to cause the pair of roller electrodes 26 and 27 to hold the workpiece W between the pair of roller electrodes 26 and 27, to rotate while holding the workpiece W between the pair of roller electrodes 26 and 27, to be moved along the to-be-welded line wp by the robot arm 13 while rotating and holding the workpiece W between the pair of roller electrodes 26 and 27.

Figure 2B:
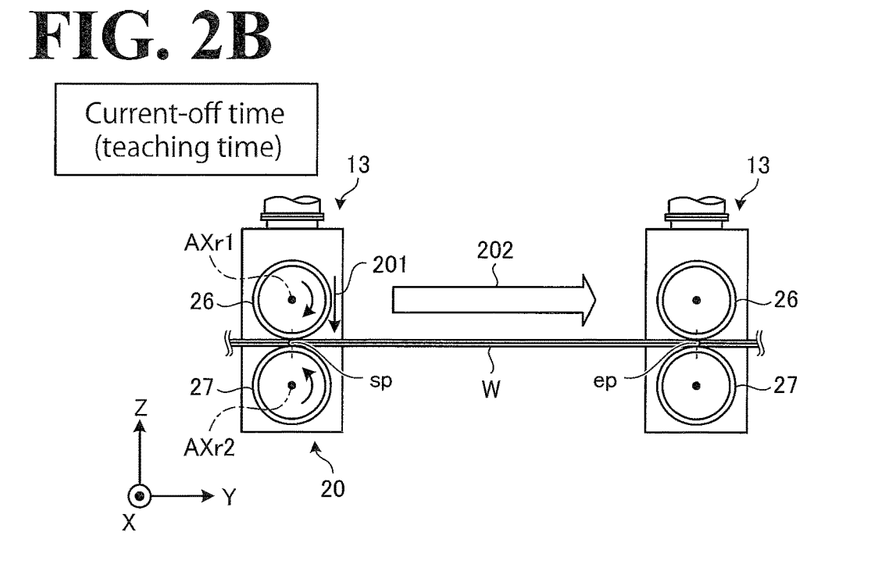
FIG. 2B is a diagram schematically illustrating a second aspect of the seam welding method according to the embodiment.

Specifically, the movements to be taught are as illustrated in FIG. 2B. The roller electrode 26 is driven into slide movement by the cylinder 24 (see the arrow 201 illustrated in FIG. 2B), and the pair of roller electrodes 26 and 27 hold the workpiece W between the pair of roller electrodes 26 and 27. Then, with the pair of roller electrodes 26 and 27 rotating while holding the workpiece W between the pair of roller electrodes 26 and 27, the welding gun 20 is moved from the start point sp to the end point ep using the robot arm 13 (see the arrow 202 illustrated in FIG. 2B).

As seen from "Current-off time (teaching time)" indicated in FIG. 2B, no current flows between the pair of roller electrodes 26 and 27 during the teaching time.

Figure 2C:
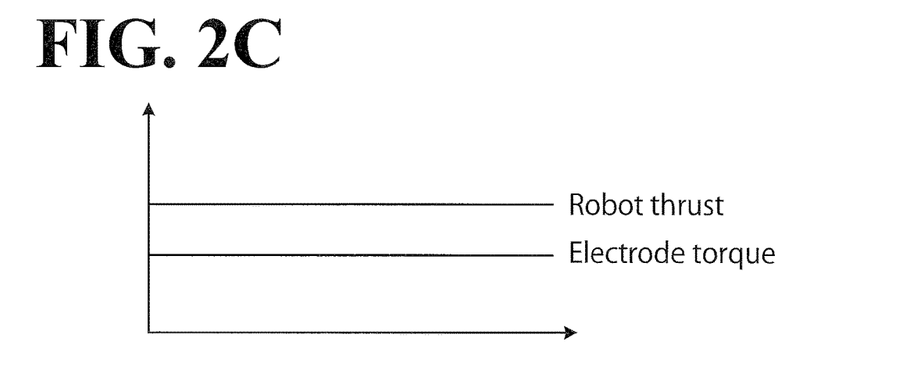
FIG. 2C is a graph schematically illustrating a third aspect of the seam welding method according to the embodiment.

Thus, the teaching in the seam welding is performed without current flowing between the pair of roller electrodes 26 and 27 and is intended to cause the pair of roller electrodes 26 and 27 to draw a track along the to-be-welded line wp. A preferable teaching is that the thrust (robot thrust) of the robot 10 and torque (electrode torque) acting on the pair of roller electrodes 26 and 27 are approximately constant, as illustrated in FIG. 2C. The teaching ensures that the welding gun 20 synchronizes with and follows the movement of the robot arm 13, resulting in a stable welding line.

Even though, however, the teaching ensures a stable welding line, the actual seam welding involves a flow of current between the pair of roller electrodes 26 and 27. Thus, the condition during the teaching time is different from the condition during the actual seam welding. Here, the seam welding method in the background art will be described.

Figure 2D:
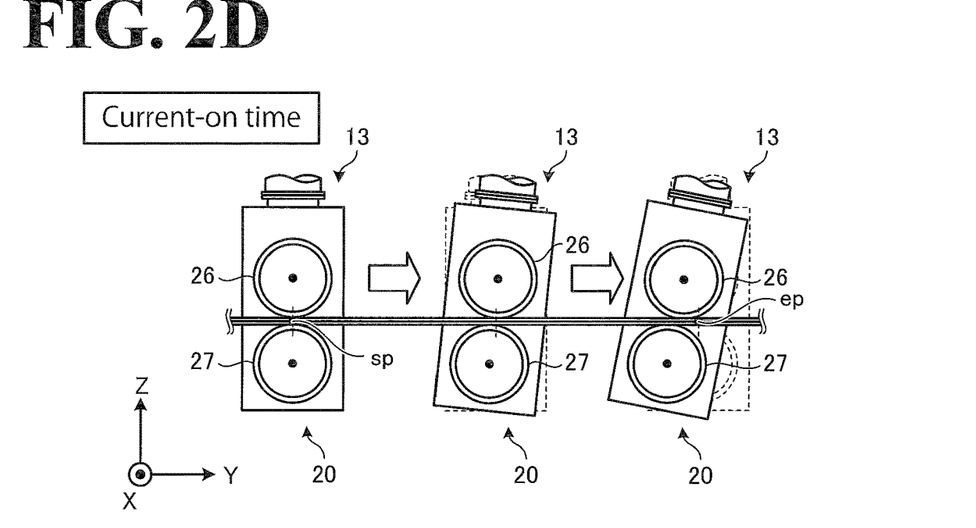
FIG. 2D is a diagram schematically illustrating a fourth aspect of the seam welding method according to the embodiment.

In spite of the teaching performed to ensure a stable welding line with the welding gun 20 synchronizing with and following the movement of the robot arm 13, the seam welding method in the background art involves a gradual displacement of the relative positions of the robot arm 13 and the welding gun 20 when a current flows between the pair of roller electrodes 26 and 27, as illustrated in FIG. 2D.

Figure 2E:
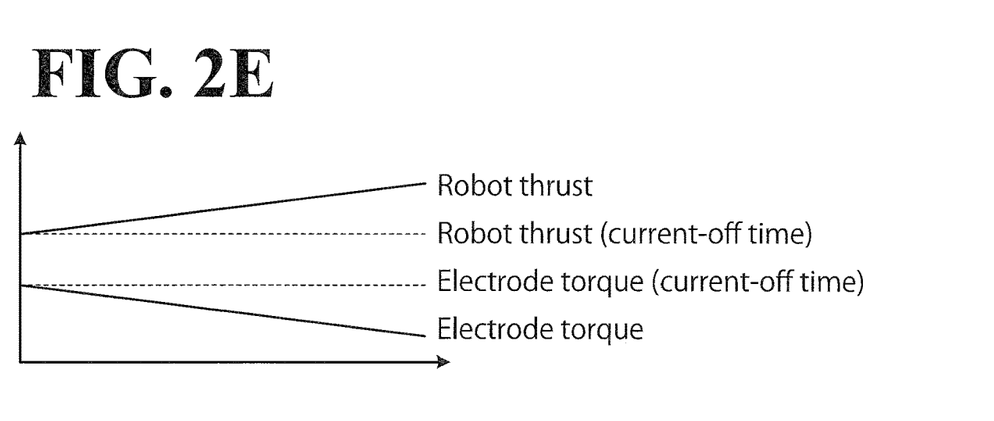
FIG. 2E is a graph schematically illustrating a fifth aspect of the seam welding method according to the embodiment.

In this case, the robot thrust and the electrode torque change as illustrated in FIG. 2E. Specifically, as illustrated in FIG. 2E, the electrode torque goes downward as compared with the electrode torque during the current-off time, while the robot thrust goes upward as compared with the robot thrust during the current-off time.

In other words, the welding gun 20 fails to keep up with the robot arm 13, or even may become dragged by the robot arm 13. Due to failed synchronization of the welding gun 20 with the robot arm 13, stress may occur between the robot arm 13 and the workpiece W, causing the robot aim 13 to bend or causing the workpiece W to be displaced.

Figure 2F:
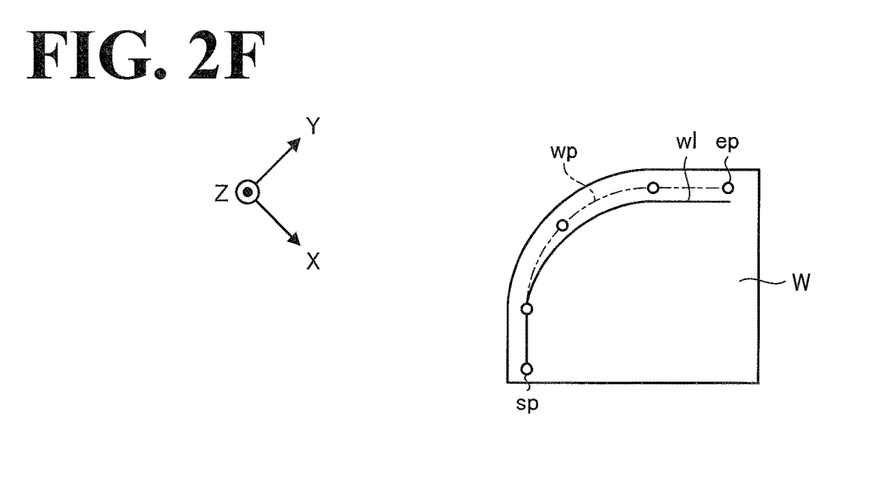
FIG. 2F is a diagram schematically illustrating a sixth aspect of the seam welding method according to the embodiment.

For example, as illustrated in FIG. 2F, an actual welding line wl may be displaced inwardly from the to-be-welded line wp. A possible explanation for this phenomenon is that the current flowing between the pair of roller electrodes 26 and 27 causes a welding pool or a similar occurrence on the workpiece W, making the pair of roller electrodes 26 and 27 more likely to slip.

Another possible explanation for the phenomenon is that the actual rotation of the pair of roller electrodes 26 and 27 lags behind the movement of the robot arm 13, causing a discrepancy between the forward angle, AZr, of the pair of roller electrodes 26 and 27 (see FIG. 1) and the tangent angle of the to-be-welded line wp.

In view of this, the seam welding method according to this embodiment is intended to draw a stable welding line wl while keeping the relationship of the positions of the robot arm 13 and the welding gun 20 within a predetermined deviation from the relationship of the positions of the robot arm 13 and the welding gun 20 during the "Current-off time (teaching time)" illustrated in FIG. 2B (or from the to-be-welded line wp) even though a current flows between the pair of roller electrodes 26 and 27.

Figure 2G:
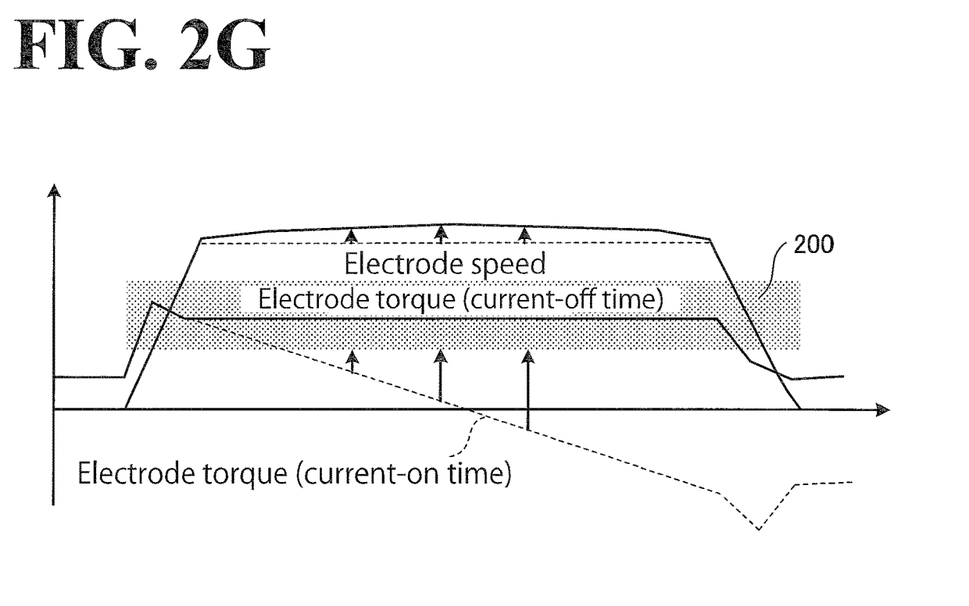
FIG. 2G is a graph schematically illustrating a seventh aspect of the seam welding method according to the embodiment.

Specifically, the rotational speeds (electrode speeds) of the pair of roller electrodes 26 and 27 are regulated to keep electrode torques respectively acting on the pair of roller electrodes 26 and 27 during the current-on time within a range 200 as illustrated in FIG. 2G. The range 200 is set in advance based on the electrode torque during the current-off time (teaching time). The range 200 is set in advance in accordance with the above-described predetermined deviation. It should be noted, however, that keeping the actual welding deviation completely within the predetermined deviation should not be construed in a limiting sense.

For example, in the seam welding method according to this embodiment, the electrode speeds of the pair of roller electrodes 26 and 27 are regulated to keep an approximately constant average, within the range 200, of the electrode torques respectively acting on the pair of roller electrodes 26 and 27.

The electrode speeds of the pair of roller electrodes 26 and 27 are regulated by controlling the amount by which the pair of roller electrodes 26 and 27 rotate based on a torque change in at least one of the servo motors M1 to M8, which are drive sources to rotate the pair of roller electrodes 26 and 27 and the joints of the robot arm 13. The torque change is acquired based on torque commands fed back from the servo motors M1 to M8 and thus is detectable in a sensor-less manner.

As illustrated in FIG. 2G, in the seam welding method according to this embodiment, when the electrode speeds are regulated, the amount by which the pair of roller electrodes 26 and 27 rotate is changed gradually rather than rapidly.

For example, in the seam welding method according to this embodiment, the amount by which the pair of roller electrodes 26 and 27 rotate is controlled at a pulse frequency as low as a few to several hertz. By gradually changing the amount by which the pair of roller electrodes 26 and 27 rotate, the movement of the welding gun 20 gradually follows the movement of the robot 10. This eliminates or minimizes such a situation that the welding line wl is corrected by a rapid change in the amount by which the pair of roller electrodes 26 and 27 rotate. An exemplary specific configuration to implement the foregoing will be described later by referring to FIGS. 3A and 3B.

Figure 2H:
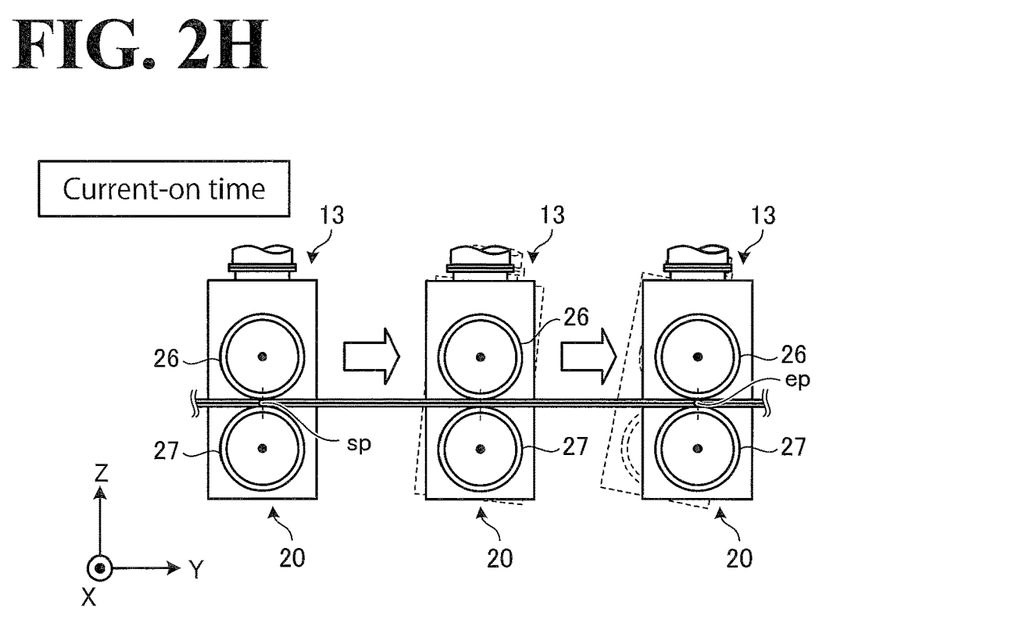
FIG. 2H is a diagram schematically illustrating an eighth aspect of the seam welding method according to the embodiment.

With the above-described measures taken in the seam welding method according to this embodiment, the amount by which the pair of roller electrodes 26 and 27 rotate is controlled. This ensures that the welding gun 20 follows the robot arm 13 during the current-on time in a manner similar to the manner in which the welding gun 20 would follow the robot arm 13 during the teaching time, even when the pair of roller electrodes 26 and 27 are likely to slip during the current-on time as illustrated in FIG. 2H. This adds to improved performance and readiness of the seam welding.

The seam welding system 1 according to this embodiment will be further described. Here, the seam welding system 1 will be described by referring to block configurations illustrated in FIGS. 3A and 3B mainly with an internal configuration of the control device 30 in focus.

Figure 3A:
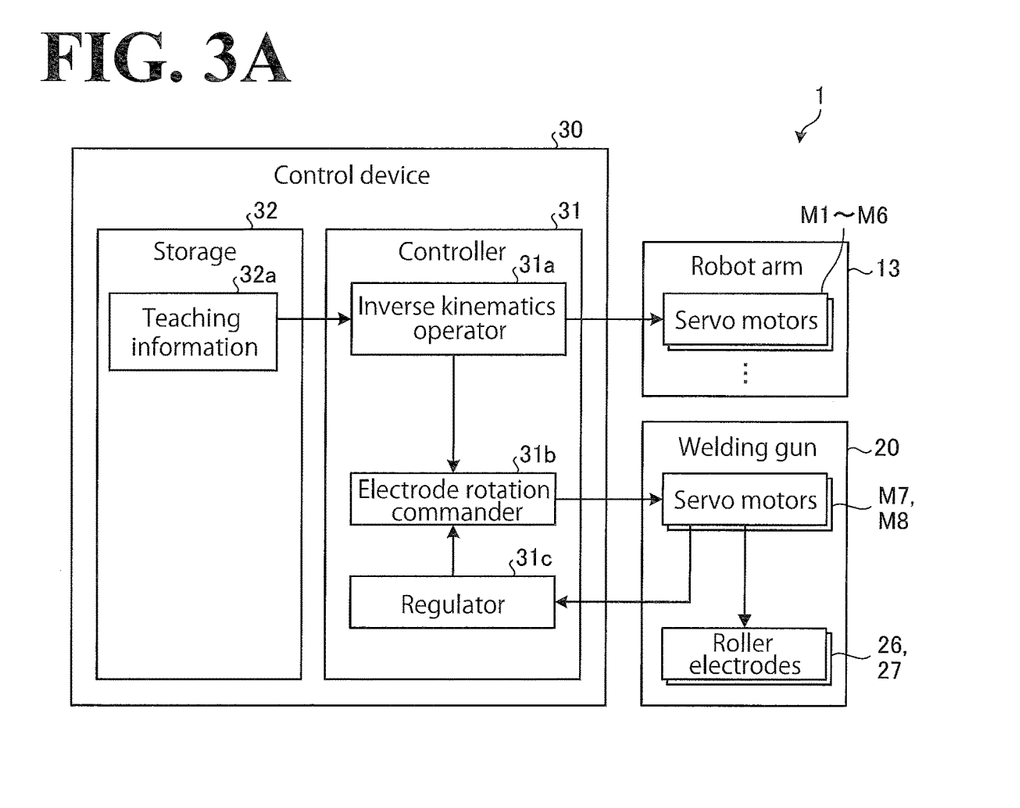
FIG. 3A is a block diagram illustrating a configuration of the seam welding system according to the embodiment.
Figure 3B:
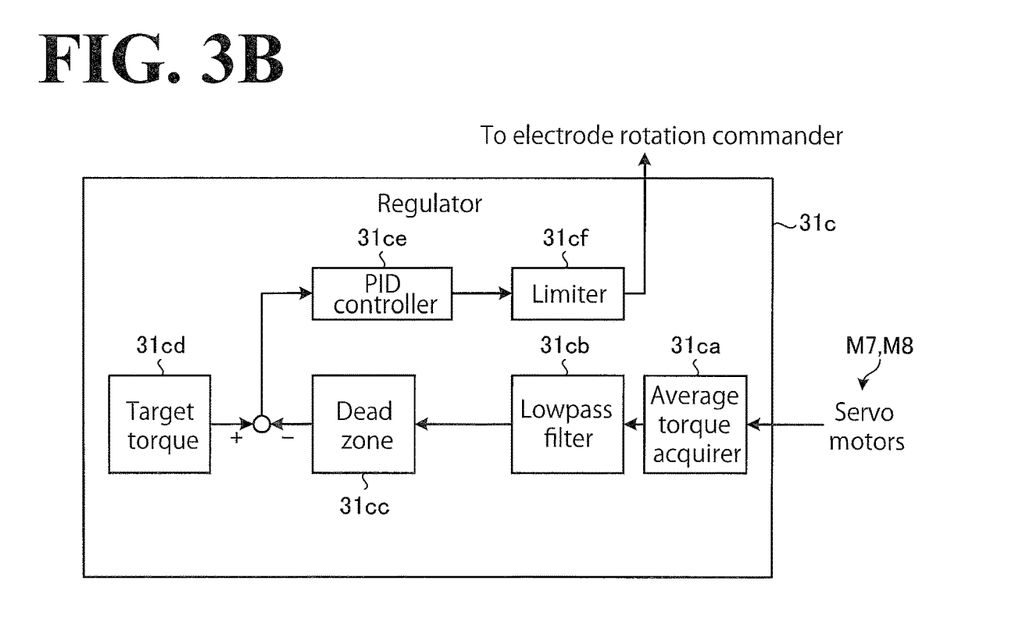
FIG. 3B is a block diagram illustrating an exemplary configuration of a regulator.

FIG. 3A is a block diagram illustrating a configuration of the seam welding system 1 according to this embodiment. FIG. 3B is a block diagram illustrating an exemplary configuration of a regulator 31c.

It is noted that FIGS. 3A and 3B only illustrate those components necessary for description of this embodiment, omitting those components unnecessary for description of this embodiment. For example, while the seam welding system 1 includes a power source to generate power for welding purposes, the power source is not illustrated in FIGS. 3A and 3B.

Also the following description referring to FIGS. 3A and 3B may not elaborate on or refer to those components already described above.

As illustrated in FIG. 3A, the control device 30 includes a controller 31 and the storage 32. The controller 31 includes an inverse kinematics operator 31a, an electrode rotation commander 31b, and the regulator 31c.

The storage 32 is a storage device such as a hard disk drive and a nonvolatile memory, and stores the teaching information 32a. The teaching information 32a is information that includes a program (corresponding to the above-described "job") specifying movement paths of the robot arm 13 and the welding gun 20. Also the teaching information 32a includes predetermined thresholds and other values corresponding to the range 200 (see FIG. 2G) and other parameters.

It is noted that not all the components of the control device 30 illustrated in FIG. 3A may necessarily be disposed in the control device 30. For example, the teaching information 32a stored in the storage 32 may be stored in an internal memory of the robot 10. Alternatively, the teaching information 32a may be stored in an upper-level device upper than the control device 30 and acquired by the control device 30 from the upper level device when necessary.

The controller 31 is in charge of overall control of the control device 30. Specifically, the controller 31 controls the amount by which the pair of roller electrodes 26 and 27 rotate based on a torque change in at least one of the servo motors M1 to M8 so as to keep the torques respectively acting on the pair of roller electrodes 26 and 27 within the predetermined range 200.

The following description will be under the assumption that the controller 31 controls the amount by which the pair of roller electrodes 26 and 27 rotate based on torque changes in the servo motors M7 and M8, which are drive sources respectively to rotate the pair of roller electrodes 26 and 27.

The inverse kinematics operator 31a controls the rotational positions of the joints of the robot arm 13 based on the movement path of the robot arm 13 registered in advance as the teaching information 32a.

For example, the inverse kinematics operator 31a regards coordinates of a target point on the movement path as a position of a representative point of the welding gun 20, regards the direction in which the roller electrode 26 is made to slide at the position by the cylinder 24 as a posture of the welding gun 20, and performs inverse a kinematics calculation to generate a movement signal to move the robot arm 13. Then, the inverse kinematics operator 31a outputs the movement signal to the servo motors M1 to M6 so as to move the robot arm 13.

Also the inverse kinematics operator 31a outputs a position command regarding the representative point to the electrode rotation commander 31b.

The electrode rotation commander 31b receives the position command from the inverse kinematics operator 31a. Based on the position command, the electrode rotation commander 31*b* calculates speed at the representative point to generate a movement signal to move the servo motors M7 and M8. Then, the electrode rotation commander 31*b* outputs the generated movement signal to the servo motors M7 and M8 to rotate the pair of roller electrodes 26 and 27.

The regulator 31*c* acquires torque changes in the servo motors M7 and M8 based on torque commands from the servo motors M7 and M8. Based on the torque changes, the regulator 31*c* performs feedback control to calculate a regulation value so as to regulate the amount by which the pair of roller electrodes 26 and 27 rotate.

Here, the regulation value calculated by the regulator 31*c* is a value that ensures that the amount by which the pair of roller electrodes 26 and 27 rotate gradually changes in the manner described earlier. Then, the regulator 31*c* outputs the calculated regulation value to the electrode rotation commander 31*b* so that the electrode rotation commander 31*b* regulates the amount by which the pair of roller electrodes 26 and 27 rotate.

As illustrated in FIG. 3B, the regulator 31*c* performs PID control (Proportional Integral Derivative Control), which is an example of the feedback control, to calculate the regulation value.

In the example illustrated in FIG. 3B, the regulator 31*c* first uses, for example, an average torque acquirer 31*ca* to acquire an average torque from the servo motors M7 and M8, and passes the average torque through a lowpass filter 31*cb* to remove a high-frequency component from the average torque.

Then, the regulator 31*c* passes the average torque less the high-frequency component through a dead zone 31*cc* to calculate an error as compared with a target torque 31*cd*. The target torque 31*cd* corresponds to the range 200.

Then, the regulator 31*c* inputs the calculated error into a PID controller 31*ce* to obtain an output value, and regards the output value as the regulation value and outputs the regulation value to the electrode rotation commander 31*b* through a limiter 31*cf*.

Thus, the regulator 31*c* performs feedback control to calculate the regulation value so as to regulate the amount by which the pair of roller electrodes 26 and 27 rotate. The regulator 31*c* calculates the regulation value based on the average torque using the lowpass filter 31*cb*, the dead zone 31*cc*, the limiter 31*cf*, and other elements. Thus, the regulation value obtained by the regulator 31*c* is a value that ensures that the amount by which the pair of roller electrodes 26 and 27 rotate changes gradually rather than rapidly.

Thus, the regulator 31*c* of the controller 31 is in charge of the step of controlling the amount by which the pair of roller electrodes 26 and 27 rotate based on a torque change in at least one of the servo motors M7 and M8, which respectively rotate the pair of roller electrodes 26 and 27, so as to keep the torques respectively acting on the pair of roller electrodes 26 and 27 within the predetermined range 200.

Figure 4:
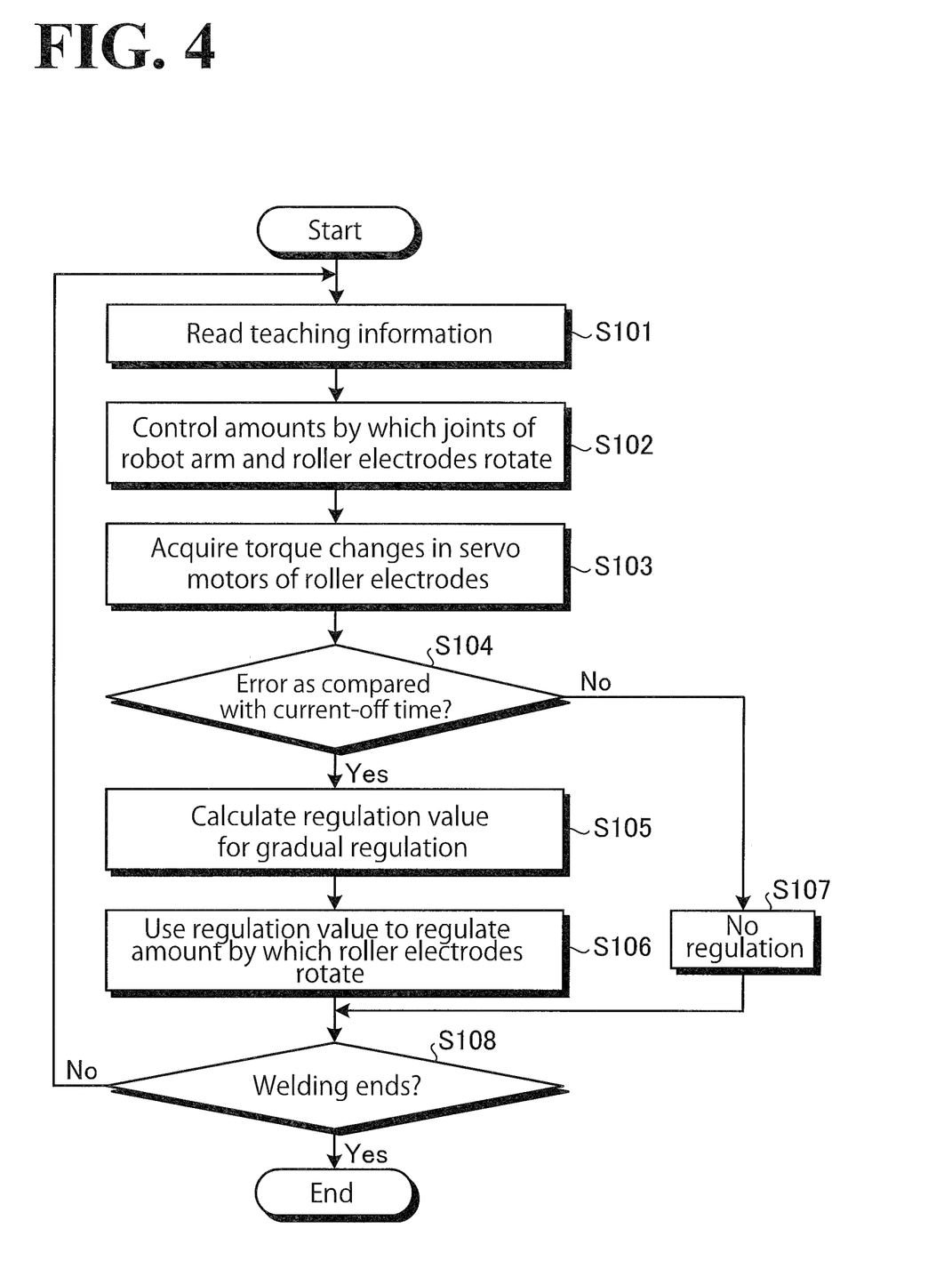
FIG. 4 is a flowchart of a procedure for processing performed by the seam welding system according to the embodiment.

Next, a procedure for processing performed by the seam welding system 1 according to this embodiment will be described by referring to FIG. 4. FIG. 4 is a flowchart of a procedure for processing performed by the seam welding system 1 according to this embodiment.

The following description referring to FIG. 4 will be under the assumption that the teaching to the robot 10 and the welding gun 20 has been done, and the program specifying the movement paths of the robot 10 and the welding gun 20 is reflected in the teaching information 32*a*.

As illustrated in FIG. 4, first, the teaching information 32*a* is read (step S101). Then, based on the teaching information 32*a*, the inverse kinematics operator 31*a* and the electrode rotation commander 31*b* control the amounts by which the joints of the robot arm 13 and the pair of roller electrodes 26 and 27 rotate (step S102).

Then, the regulator 31*c* acquires torque changes in the servo motors M7 and M8, which are respectively dedicated to the pair of roller electrodes 26 and 27 (step S103). Then, the regulator 31*c* determines whether there is an error in torque as compared with the torque during the current-off time (step S104).

When the regulator 31*c* determines that there is an error in torque as compared with the torque during the current-off time (step S104, Yes), the regulator 31*c* calculates a regulation value that ensures gradual regulation (step S105).

Then, the electrode rotation commander 31*b* uses the regulation value calculated by the regulator 31*c* to regulate the amount by which the pair of roller electrodes 26 and 27 rotate (step S106).

When at step S104 no conditions for the determination are met (step S104, No), the amount by which the pair of roller electrodes 26 and 27 rotate is not regulated (step S107).

Next, a determination is made as to whether the welding has ended (step S108). Specifically, the determination includes, for example, determining whether there is a next program step in the teaching information 32*a*.

Then, when the welding has not ended (step S108, No), the controller 31 repeats the processing at and later than step S101. When the welding has ended (step S108, Yes), the processing ends.

As has been described hereinbefore, the seam welding systems according to this embodiment includes the roller electrodes, the electrode movement mechanism (robot arm), the plurality of drive sources (servo motors), and the controller.

The roller electrodes form a pair to perform seam welding on the to-be-welded object when a current flows between the pair of roller electrodes while the pair of roller electrodes are rotating and holding the to-be-welded object between circumferential surfaces of the pair of roller electrodes. To the electrode movement mechanism, the pair of roller electrodes are mounted. The electrode movement mechanism moves the pair of roller electrodes along a welding line of the to-be-welded object.

The plurality of drive sources respectively rotate the pair of roller electrodes and the joints of the electrode movement mechanism. The controller controls the amount by which the pair of roller electrodes rotate based on a torque change in the plurality of drive sources so as to keep torques respectively acting on the pair of roller electrodes within a predetermined range.

Thus, the seam welding system according to this embodiment ensures improved performance and readiness of seam welding.

In this embodiment, the regulator calculates a regulation value based on an average of torques of a pair of servo motor that respectively rotate the pair of roller electrodes. This, however, should not be construed in a limiting sense. For example, the regulator may calculate an individual regulation value to regulate the amount by which each of the pair of roller electrodes rotates based on an individual torque change in each of the pair of servo motors.

Also in this embodiment, the amount by which the pair of roller electrodes rotate is controlled based on a torque change in the servo motors of the pair of roller electrodes. It is also possible to control the amount by which the pair of roller electrodes rotate based on a torque change in any of the servo motors of the robot arm. Specifically, it is possible to control the amount by which the pair of roller electrodes rotate based on a torque change in at least one of the plurality of servo motors that respectively rotate the joints of the robot arm.

Figure 5:
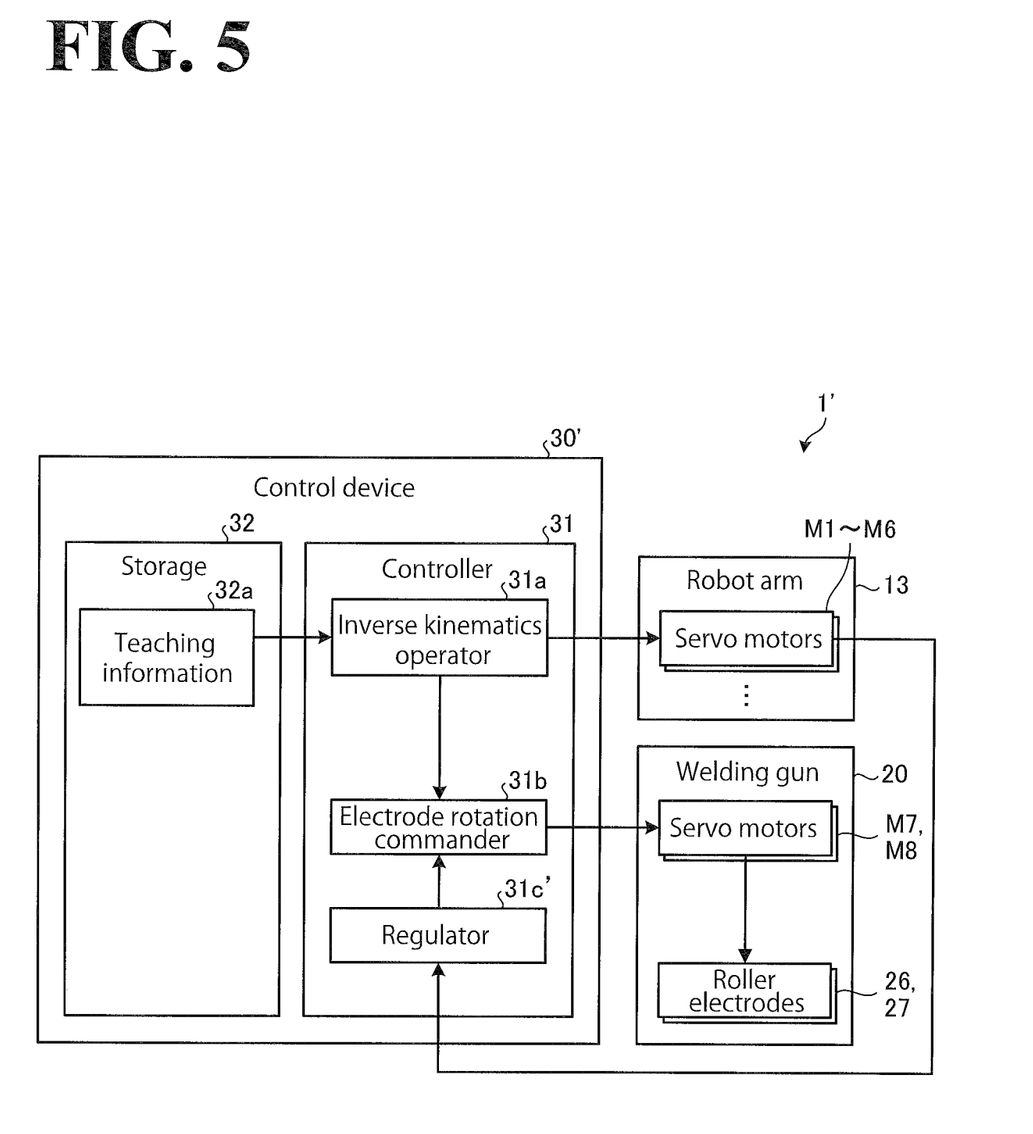
FIG. 5 is a block diagram illustrating a configuration of a seam welding system according to another embodiment.

This another embodiment is illustrated in FIG. 5. FIG. 5 is a block diagram illustrating a configuration of a seam welding system 1' according to the another embodiment. FIG. 5 corresponds to FIG. 3A, described above, and the following description will be mainly regarding those respects different from FIG. 3A.

As illustrated in FIG. 5, the seam welding system according to the another embodiment includes a control device 30', which includes a regulator 31c'. The regulator 31c' acquires a torque change in at least one of the servo motors M1 to M6 of the robot arm 13. Based on the acquired torque change in at least one of the servo motors M1 to M6 of the robot arm 13, the regulator 31c' calculates a regulation value to regulate the amount by which the pair of roller electrodes 26 and 27 rotate.

Then, the regulator 31c' outputs the calculated regulation value to the electrode rotation commander 31b so that the electrode rotation commander 31b regulates the amount by which the pair of roller electrodes 26 and 27 rotate. The another embodiment is similar to the above-described embodiment in that the torque change is acquired based on a torque command fed back from the servo motors M1 to M6 and thus is detectable in a sensor-less manner.

In the above-described embodiments, the seam welding system is a robot system with a six-axis single-arm robot. This, however, should not be construed as limiting the number of axes and the number of arms. Other possible examples include, but are not limited to, a seven-axis robot and a two-arm robot. The seam welding system may be other than a robot system.

The above-described embodiments are applicable to a method for producing a to-be-welded object. Specifically, the method for producing a to-be-welded object may include: moving a pair of roller electrodes along a welding line of a to-be-welded object using an electrode movement mechanism, the pair of roller electrodes being disposed in the electrode movement mechanism, configured to hold the to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces; and controlling an amount by which the pair of roller electrodes rotate based on a torque change in at least one of a plurality of drive sources so as to keep torques respectively acting on the pair of roller electrodes within a predetermined range, the plurality of drive sources being respectively configured to rotate the pair of roller electrodes and a joint of the electrode movement mechanism. The method ensures that the to-be-welded object is subjected to hermetic welding stably with eliminated or minimized displacement from an intended welding line.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A seam welding system comprising:
 a pair of roller electrodes configured to hold a to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces;
 an electrode movement mechanism to which the pair of roller electrodes are mounted, the electrode movement mechanism being configured to move the pair of roller electrodes along a welding line of the to-be-welded object;
 a plurality of drive sources respectively configured to rotate the pair of roller electrodes and a joint of the electrode movement mechanism, the plurality of drive sources including a roller electrode drive source configured to rotate a corresponding one of the pair of roller electrodes;
 a frame upon which the pair of roller electrodes and the roller electrode drive source are mounted, the frame being directly pivotally coupled to the electrode movement mechanism about a rotational axis, the rotational axis extends in a direction orthogonal to axes about which the pair of roller electrodes rotate; and
 a controller configured to determine a torque change in at least one of the plurality of drive sources and to control an amount by which the pair of roller electrodes rotate based on the determined torque change, the controller configured to control the roller electrode drive source and change the amount by which the pair of roller electrodes rotate to thereby keep torques respectively acting on the pair of roller electrodes within a predetermined range,
 wherein the controller is configured to calculate the predetermined range based on a teaching time during which the pair of roller electrodes are rotated while current does not flow between the pair of roller electrodes in order to determine error in torques during welding using the pair of roller electrodes as compared with torques determined while current does not flow between the pair of roller electrodes.

2. The seam welding system according to claim 1, wherein the controller is configured to control the amount by which the pair of roller electrodes rotate based on the determined torque change in one of the plurality of drive sources, the one of the plurality of drive sources being configured to rotate the joint of the electrode movement mechanism.

3. The seam welding system according to claim 1, wherein the controller is configured to control the amount by which the pair of roller electrodes rotate based on the determined torque change in one of the plurality of drive sources, the one of the plurality of drive sources being the roller electrode drive source configured to rotate the corresponding one of the pair of roller electrodes.

4. The seam welding system according to claim 1, wherein the controller is configured to control the amount by which the pair of roller electrodes rotate so as to keep a constant average of the torques respectively acting on the pair of roller electrodes.

5. The seam welding system according to claim 1, wherein the controller is configured to gradually change the amount by which the pair of roller electrodes rotate.

6. A seam welding method comprising:
moving a pair of roller electrodes along a welding line of a to-be-welded object using an electrode movement mechanism, the pair of roller electrodes being coupled to the electrode movement mechanism, configured to hold the to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces, the pair of roller electrodes being mounted on a frame that is directly pivotally coupled to the electrode movement mechanism about a rotational axis, the rotational axis extending in a direction orthogonal to axes about which the pair of roller electrodes rotate;
determining a torque change in at least one of a plurality of drive sources; and
controlling an amount by which the pair of roller electrodes rotate based on the determined torque change,
wherein controlling the amount by which the pair of roller electrodes rotate includes keeping torques respectively acting on the pair of roller electrodes within a predetermined range by changing the amount by which the pair of roller electrodes rotate,
wherein the plurality of drive sources are respectively configured to rotate the pair of roller electrodes and a joint of the electrode movement mechanism, and
further comprising calculating the predetermined range based on a teaching time during which the pair of roller electrodes are rotated while current does not flow between the pair of roller electrodes in order to determine error in torques during welding using the pair of roller electrodes as compared with torques determined while current does not flow between the pair of roller electrodes.

7. A method for producing a to-be-welded object, the method comprising:
moving a pair of roller electrodes along a welding line of a to-be-welded object using an electrode movement mechanism, the pair of roller electrodes being coupled to the electrode movement mechanism, configured to hold the to-be-welded object between circumferential surfaces of the pair of roller electrodes, configured to rotate while holding the to-be-welded object between the circumferential surfaces, and configured to perform seam welding on the to-be-welded object when a current flows between the pair of roller electrodes while the pair of roller electrodes are rotating and holding the to-be-welded object between the circumferential surfaces, the pair of roller electrodes being mounted on a frame that is directly pivotally coupled to the electrode movement mechanism about a rotational axis, the rotational axis extending in a direction orthogonal to axes about which the pair of roller electrodes rotate;
determining a torque change in at least one of a plurality of drive sources; and
controlling an amount by which the pair of roller electrodes rotate based on the determined torque change,
wherein controlling the amount by which the pair of roller electrodes rotate includes keeping torques respectively acting on the pair of roller electrodes within a predetermined range by changing the amount by which the pair of roller electrodes rotate,
wherein the plurality of drive sources are respectively configured to rotate the pair of roller electrodes and a joint of the electrode movement mechanism, and
further comprising calculating the predetermined range based on a teaching time during which the pair of roller electrodes are rotated while current does not flow between the pair of roller electrodes in order to determine error in torques during welding using the pair of roller electrodes as compared with torques determined while current does not flow between the pair of roller electrodes.

8. The seam welding system according to claim 2, wherein the controller is configured to control the amount by which the pair of roller electrodes rotate so as to keep a constant average of the torques respectively acting on the pair of roller electrodes.

9. The seam welding system according to claim 3, wherein the controller is configured to control the amount by which the pair of roller electrodes rotate so as to keep a constant average of the torques respectively acting on the pair of roller electrodes.

10. The seam welding system according to claim 8, wherein the controller is configured to gradually change the amount by which the pair of roller electrodes rotate.

11. The seam welding system according to claim 9, wherein the controller is configured to gradually change the amount by which the pair of roller electrodes rotate.

12. The seam welding system according to claim 1, wherein the movement mechanism includes a robot arm or a uniaxial drive mechanism.

13. The seam welding system according to claim 1, wherein each of the plurality of drive sources include a motor.

14. The seam welding method according to claim 6, wherein the movement mechanism includes at least one of a robot arm and a uniaxial drive mechanism.

15. The seam welding method according to claim 6, wherein each of the plurality of drive sources include a motor.

16. The method according to claim 7, wherein the movement mechanism includes a robot arm or a uniaxial drive mechanism.

17. The method according to claim 7, wherein each of the plurality of drive sources include a motor.

18. The seam welding system according to claim 1, wherein the plurality of drive sources further includes a further roller electrode drive source configured to rotate an other one of the pair of roller electrodes, the roller electrode drive source and the further roller electrode drive source being configured to rotate the pair of roller electrodes to cause the pair of roller electrodes to follow a movement of the electrode movement mechanism.

19. The seam welding method according to claim 6, wherein the plurality of drive sources further includes a further roller electrode drive source configured to rotate an other one of the pair of roller electrodes, the roller electrode drive source and the further roller electrode drive source being configured to rotate the pair of roller electrodes to cause the pair of roller electrodes to follow a movement of the electrode movement mechanism.

20. The seam welding method according to claim 7, wherein the plurality of drive sources further includes a further roller electrode drive source configured to rotate an other one of the pair of roller electrodes, the roller electrode drive source and the further roller electrode drive source being configured to rotate the pair of roller electrodes to cause the pair of roller electrodes to follow a movement of the electrode movement mechanism.

21. The seam welding system according to claim 1,
wherein the movement mechanism includes a robot arm having a wrist and a flange provided on an end of the robot arm, the flange being pivotally coupled to the wrist,
wherein the frame is mounted to the flange, and
the plurality of drive sources includes a drive sources to rotate the flange and frame mounted thereto about the rotational axis.

22. The seam welding method according to claim 6,
wherein the movement mechanism includes a robot arm having a wrist and a flange provided on an end of the robot arm, the flange being pivotally coupled to the wrist,
wherein the frame is mounted to the flange, and
the plurality of drive sources includes a drive sources to rotate the flange and frame mounted thereto about the rotational axis.

23. The seam welding method according to claim 7,
wherein the movement mechanism includes a robot arm having a wrist and a flange provided on an end of the robot arm, the flange being pivotally coupled to the wrist,
wherein the frame is mounted to the flange, and
the plurality of drive sources includes a drive sources to rotate the flange and frame mounted thereto about the rotational axis.

* * * * *